(12) United States Patent
Huettner et al.

(10) Patent No.: US 6,816,372 B2
(45) Date of Patent: Nov. 9, 2004

(54) SYSTEM, METHOD AND APPARATUS FOR NOISE AND HEAT SUPPRESSION, AND FOR MANAGING CABLES IN A COMPUTER SYSTEM

(75) Inventors: Cary Michael Huettner, Rochester, MN (US); Jeffrey L. Justin, Oronoco, MN (US); Michael Desmond O'Connell, Rochester, MN (US); Kenneth Robert Peters, Rochester, MN (US); Gregory Scott Vande Corput, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 10/338,290

(22) Filed: Jan. 8, 2003

(65) Prior Publication Data

US 2004/0130867 A1 Jul. 8, 2004

(51) Int. Cl.$^7$ ................................................. H05K 7/20
(52) U.S. Cl. ....................... 361/695; 361/688; 361/687; 361/692; 454/184
(58) Field of Search ............................ 361/686–695, 361/724–727; 62/259.2; 454/184; 174/15.1, 16.1, 16.3; 165/121, 122, 104.33, 104.34, 123–126; 415/115, 119, 206; 417/312; 181/224–225, 229, 252, 255, 258; 219/700

(56) References Cited

U.S. PATENT DOCUMENTS

| | | |
|---|---|---|
| 3,654,382 A | 4/1972 | Rubright |
| 3,929,207 A | 12/1975 | Urban |
| 3,963,094 A | 6/1976 | Nowikas |
| 4,233,644 A | 11/1980 | Hwang et al. |
| 4,237,667 A | 12/1980 | Pallucci et al. |
| 4,260,849 A | 4/1981 | Kirby |

(List continued on next page.)

FOREIGN PATENT DOCUMENTS

| | | | | |
|---|---|---|---|---|
| DE | 19625606 A1 | * | 1/1996 | ............ F24F/13/24 |
| JP | 57181200 | * | 11/1982 | ............. G06F/1/00 |
| JP | 405102686 A | * | 4/1993 | ............. H05K/7/20 |
| JP | 406195155 A | * | 7/1994 | ............. G06F/1/20 |
| JP | 409274489 A | * | 10/1997 | ......... G10K/11/178 |
| JP | 410093274 A | * | 4/1998 | ............. H05K/7/20 |
| JP | 411153894 A | * | 6/1999 | .......... G03G/15/00 |

OTHER PUBLICATIONS

IBM Technical Disclosure Bulletin, vol. 13, No. 11, Apr. 1971, pp. 3286.
"Contact Strip Closure for Shielding Covers" by E.P. Damm Jr., et al.
IBM Technical Disclosure Bulletin, vol. 28, No. 10, Mar. 1986, pp. 4653–4654.
"Self–Balancing Air Flow Distribution Mechanism" by R.J. Correa et al.
IBM Technical Disclosure Bulletin, vol. 31, No. 1, Jun. 1988, pp. 325–328.
"Electrical Ground Enclosure Improvement" by R.J. Beisel et al.
IBM Technical Disclosure Bulletin, vol. 37, No. 04A, Apr. 1994, pp. 671–672.
"Removal Operator Panel" by D.J. Lidberg.
IBM Technical Disclosure Bulletin, vol. 38, No. 09, Sep. 1995, pp. 463–464.
"Enhanced Convective Cooling" by G.M. Chrysler et al.

* cited by examiner

*Primary Examiner*—Michael Datskovsky
(74) *Attorney, Agent, or Firm*—Leslie J. Payne

(57) ABSTRACT

A method, system, and apparatus are disclosed for handling fluid flow in a computer system for suppressing noise and heat, and, in addition, for enhancing external cable management for use with the computer system.

17 Claims, 10 Drawing Sheets

U.S. PATENT DOCUMENTS

| | | | |
|---|---|---|---|
| 4,266,602 A | 5/1981 | White et al. | |
| 4,302,917 A | 12/1981 | Fermvik et al. | |
| 5,004,866 A | 4/1991 | Cooke et al. | |
| 5,090,117 A | 2/1992 | Dickie | |
| 5,225,629 A | 7/1993 | Garrett | |
| 5,243,153 A | 9/1993 | Holwerda | |
| 5,245,131 A | 9/1993 | Golden et al. | |
| 5,270,487 A | 12/1993 | Sawamura | |
| 5,321,581 A | 6/1994 | Bartilson et al. | |
| 5,335,147 A | 8/1994 | Weber | |
| 5,422,787 A | 6/1995 | Gourdine | |
| 5,452,362 A * | 9/1995 | Burward-Hoy | 381/71.5 |
| 5,467,250 A | 11/1995 | Howard et al. | |
| 5,473,110 A | 12/1995 | Johnson | |
| 5,508,889 A | 4/1996 | Ii | |
| 5,526,228 A * | 6/1996 | Dickson et al. | 361/695 |
| 5,532,428 A | 7/1996 | Radloff et al. | |
| 5,557,078 A | 9/1996 | Holwerda | |
| 5,601,349 A | 2/1997 | Holt | |
| 5,663,536 A | 9/1997 | Kaplan | |
| 5,721,670 A | 2/1998 | Cochrane et al. | |
| 5,736,677 A | 4/1998 | Sato et al. | |
| 5,751,550 A | 5/1998 | Korinsky | |
| 5,763,824 A | 6/1998 | King et al. | |
| 5,777,854 A | 7/1998 | Welch et al. | |
| 5,949,645 A | 9/1999 | Aziz et al. | |
| 5,981,877 A | 11/1999 | Sakata et al. | |
| 6,031,717 A | 2/2000 | Baddour et al. | |
| 6,064,003 A | 5/2000 | Moore et al. | |
| 6,090,728 A | 7/2000 | Yenni, Jr. et al. | |
| 6,104,608 A * | 8/2000 | Casinelli et al. | 361/692 |
| 6,107,574 A | 8/2000 | Chang et al. | |
| 6,108,203 A | 8/2000 | Dittus et al. | |
| 6,118,076 A | 9/2000 | Damm et al. | |
| 6,141,213 A * | 10/2000 | Antonuccio et al. | 361/687 |
| 6,154,361 A | 11/2000 | Anderson et al. | |
| 6,198,627 B1 * | 3/2001 | Roehling et al. | 361/688 |
| 6,219,258 B1 | 4/2001 | Denzene et al. | |
| 6,222,730 B1 * | 4/2001 | Korvenheimo et al. | 361/696 |
| 6,278,608 B1 | 8/2001 | Ater et al. | |
| 6,284,970 B1 | 9/2001 | Buskmiller et al. | |
| 6,288,902 B1 | 9/2001 | Kim et al. | |
| 6,290,236 B1 | 9/2001 | Hagmann | |
| 6,296,333 B1 | 10/2001 | Lee et al. | |
| 6,297,457 B1 | 10/2001 | Yamada et al. | |
| 6,324,062 B1 | 11/2001 | Treiber et al. | |
| 6,353,185 B1 | 3/2002 | Sakata | |
| 6,359,989 B2 * | 3/2002 | Hickman et al. | 381/71.5 |
| 6,459,578 B1 * | 10/2002 | Wagner | 361/694 |
| 6,745,149 B2 * | 6/2004 | Beeten | 702/132 |

SYSTEM, METHOD AND APPARATUS FOR NOISE AND HEAT SUPPRESSION, AND FOR MANAGING CABLES IN A COMPUTER SYSTEM

BACKGROUND OF THE INVENTION

The present invention relates generally to a method, system, and apparatus of fluid handling for suppressing noise and heat, as well as for enhancing cable management. In particular, the present invention relates to systems, methods, and apparatus for handling air in the suppression of noise and heat, in addition for enhancing external cable management for use with computer systems.

As computer systems become more complex they require more electrical power and consequently generate greater amounts of potentially damaging heat. Typically, the heat is removed by fluid handling devices as through the application of blowers or fans that are generally installed on the back of the computer system chassis. In many situations, the blowers or fans are installed in parallel through the computer chassis for providing sufficient quantities of air for cooling the system. For instance, a group of smaller fans tend to be used for directing air from the power components of the system to a relatively low pressure outlet. An exhaust fan is also used and is operable for providing a relatively high pressure outlet duct for directing heated air from the chassis interior to the ambient surroundings and this usually located adjacent the low pressure outlet. One potential for problems arises because of the desire to provide additional acoustical attenuation from the application of acoustical attenuating covers. For systems with air moving devices of different sizes and pressure capabilities, the restriction from the additional acoustical material often results in a pressure build-up which can cause the weaker air moving device to reduce its air flow, stall or even reverse flow. Of course, this impacts negatively on overall system cooling. Additionally, there are efforts to further reduce workplace noise; especially given the trend of so-called open space office environments. This has led to an interest in converting standing servers and future releases of server models to so-called workstations that satisfy noise criteria for the workplace.

Without the ability for successfully controlling heat and noise in a computer system, the latter may be less desirable than otherwise desired; especially in workplace environments wherein sound and heat issues are of significant importance.

SUMMARY OF THE INVENTION

To overcome shortcomings of the prior art, the present invention relates to methods, systems, and apparatus for handling fluid flow in a computer system for suppressing noise and heat, in addition for enhancing external cable management for use with computer systems.

A method adapted for handling fluid flow through a computer system including a fluid handling system internally of a computer chassis of the system, wherein the fluid handling system provides at least first and second outlets having corresponding higher and lower pressure flows with respect to each other; the method comprising the steps of: separating the higher and lower pressure flows from the first and second outlets externally of the chassis by providing at least a closure assembly having separate passages for each of the first and second outlets.

In an illustrated embodiment, provision is made for providing a cable management system within the closure assembly for effecting at least, in part, separation of the high and low pressure flows, and wherein the cable management system supports and positions one or more external cables from the chassis so as to allow one or more external cables to pass therethrough form one separated passage to another.

In still another illustrated embodiment, provision is made for suppressing noise adjacent an inlet end of the fluid handling device within the computer system through at least an acoustical insert assembly including noise attenuating material.

In still another illustrated embodiment, provision is made for a computer system comprising a computer chassis and one or more external cables extending from the chassis. The computer system includes a fluid handling system internally of the chassis and comprising at least first and second fluid outlets having corresponding higher and lower pressure flows with respect to each other; the method comprising the steps of: separating the higher and lower pressure flows from the first and second outlets externally of the chassis by providing at least a closure assembly having separate passages for each of the first and second outlets. In another embodiment, the system provides for removably mounting the outlet assembly to the chassis. Also, an acoustical insert assembly is preferably mounted within an inlet opening of the fluid handling system for attenuating noise at the inlet.

In still another illustrated embodiment, provision is made for an apparatus adapted for use in conjunction with a computer system having a chassis and a fluid handling system providing at least first and second outlets having corresponding higher and lower pressure flows with respect to each other. The apparatus comprises a housing assembly attachable to the chassis. Included in the housing member are partitions that form at least a pair of first and second fluid passages. When the apparatus is mounted to the chassis each of the first and second passages cooperate independently with the first and second outlets for maintaining separation of the first and second pressure flows. In yet another illustrated embodiment, provision is made for a cable management system being mounted within the housing member for positioning and supporting one or more external cables. In yet still another embodiment, provision is made for the cable management system as noted above having a segment, in part, separating the passages, and for supporting and positioning one or more of the cables so as to extend therethrough and communicate with the passages.

It is, therefore, principal aspects of this invention are method, system, and apparatus for providing significant improvements in the suppression of heat and noise particularly for computer systems.

It is an exemplary aspect of the present invention are method, system, and apparatus for providing significant improvements in fluid handling of fluid handling systems within a computer system for suppressing heat and noise.

It is another aspect of the present invention are method, system and apparatus for providing noise suppression at both inlet and outlets by easily mountable devices.

It is still another aspect of the present invention are method, system and apparatus for providing a cost effective solution for not only suppressing heat and noise, but in achieving management of external cables in a highly compact construction.

It is an aspect of the present invention is for providing, in addition to the foregoing fluid handling management, the management of one or more external cable devices. In still another exemplary aspect of the present invention the cable management system is integral with a portion of the fluid handling system.

It is still another aspect of the present invention for providing a method, system, and apparatus that suppresses noise and is easily inserted into hard file bays.

It is still another aspect of the present invention for providing method, system, and apparatus easily converts a server to a workstation that satisfies noise issues.

It is still another aspect of the present invention for providing method, system, and apparatus that is highly adaptable across a wide variety of computer systems.

It is still another aspect of the present invention for providing a method, system, and apparatus that is serviceable and recyclable.

BRIEF DESCRIPTION OF THE DRAWINGS

For a more complete understanding of the present invention, reference is now made to the following detailed description of a preferred embodiment of the present invention illustrated in the accompanying drawings in which.

DETAILED DESCRIPTION

Figure 1:
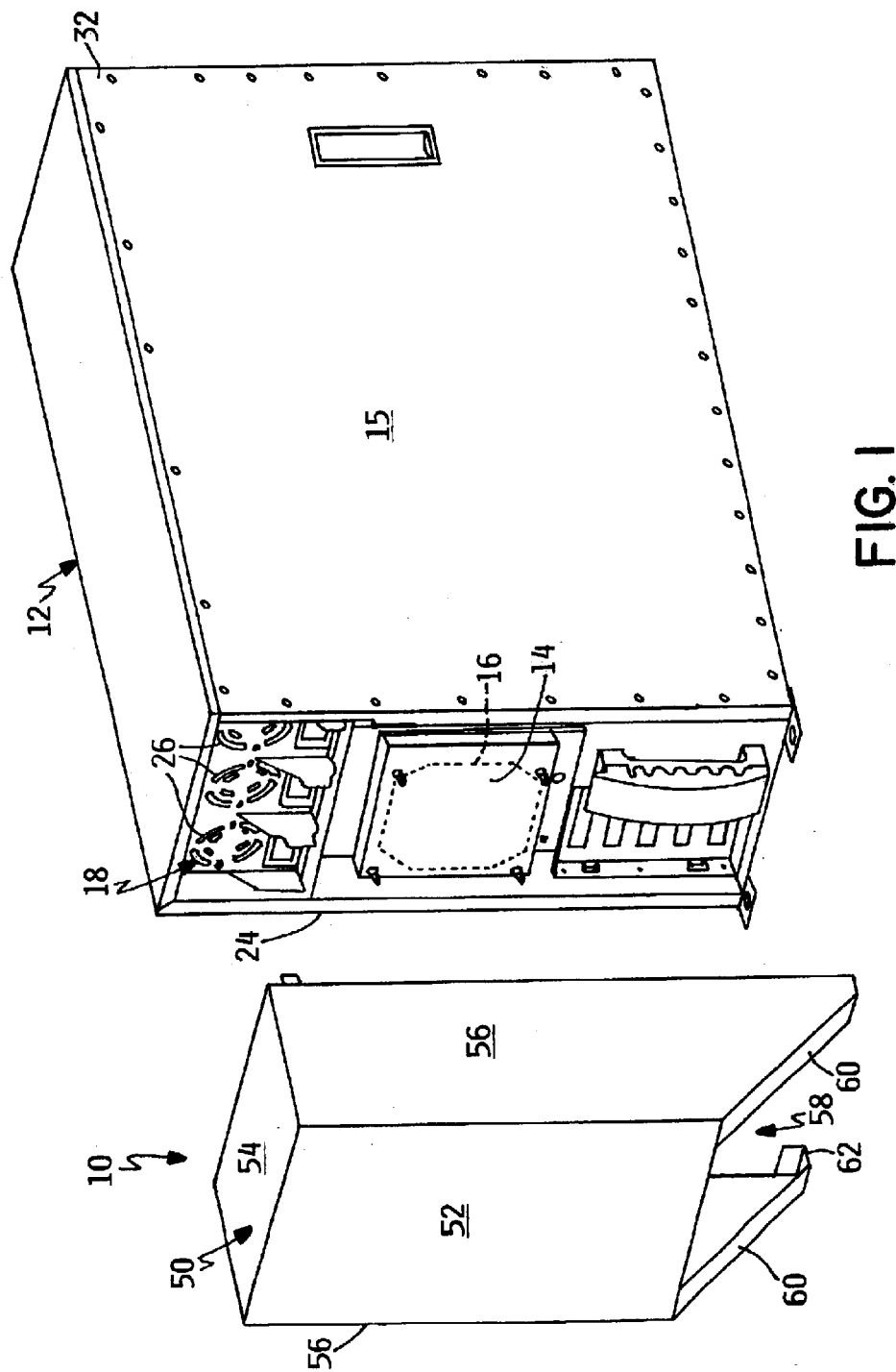
FIG. 1 is a perspective view partially exploded illustrating one preferred embodiment of the present invention.

Reference is now made to FIGS. 1–10 for illustrating preferred embodiments of the present invention. FIGS. 1–7 illustrate a fluid handling apparatus 10 that is adapted for handling fluid of a computer system 12 having a fluid handling system 14 only a portion thereof is shown (e.g., inlets, outlets and fans) internally of a computer chassis 15. The computer system 12 of the present invention is eServer iSeries 400 server 12 commercially available from International Business Machines Corporation, Armonk, N.Y. Clearly, the present invention can be used in conjunction with a wide variety of other servers consistent with the teachings of the present invention. The fluid handling system 14 includes at least first and second outlets 16 and 18; respectively, for providing parallel paths of air for cooling different components of the server.

Figure 2:
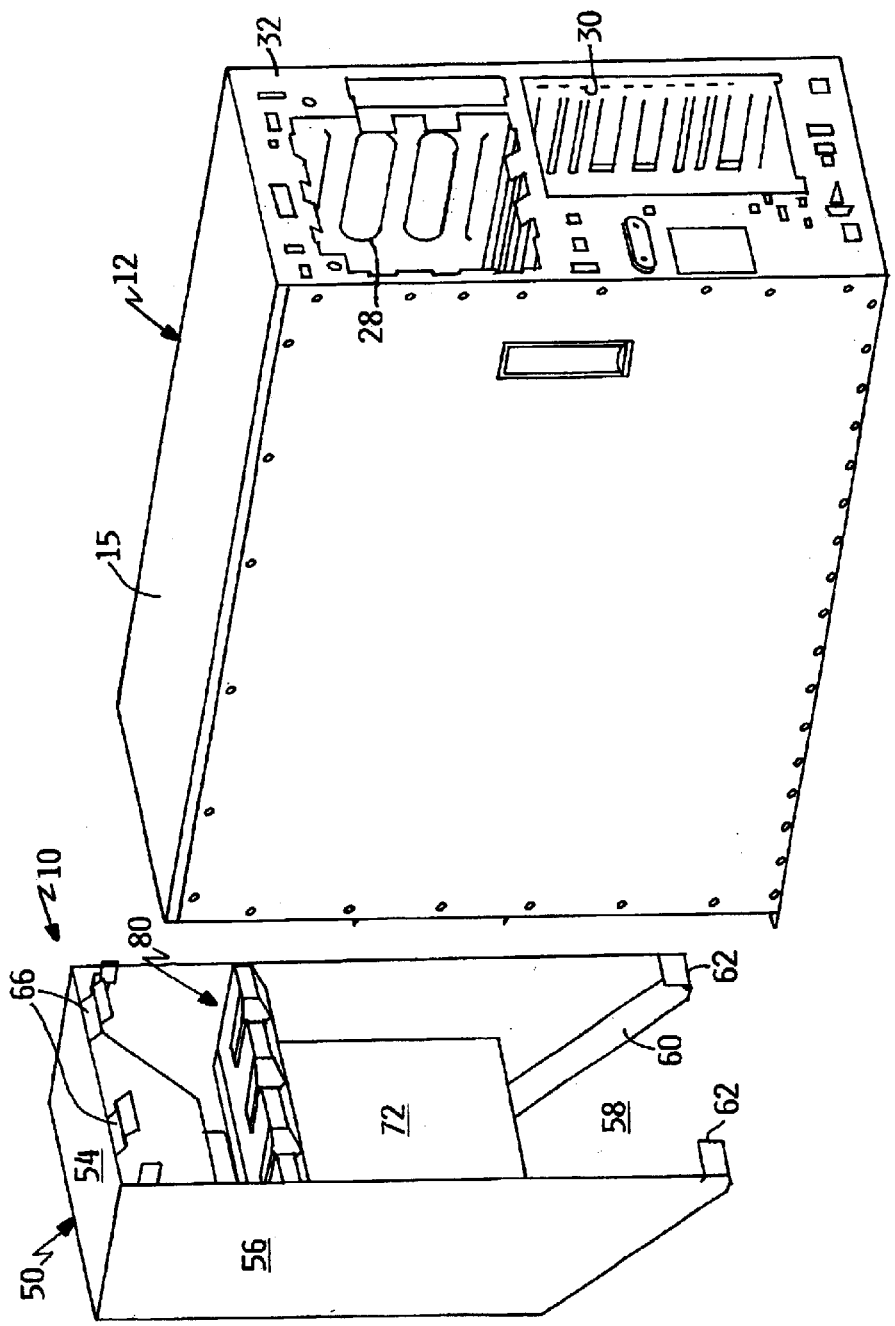
FIG. 2 is a perspective view partially exploded illustrating one preferred embodiment of the present invention, but from another perspective.
Figure 8:
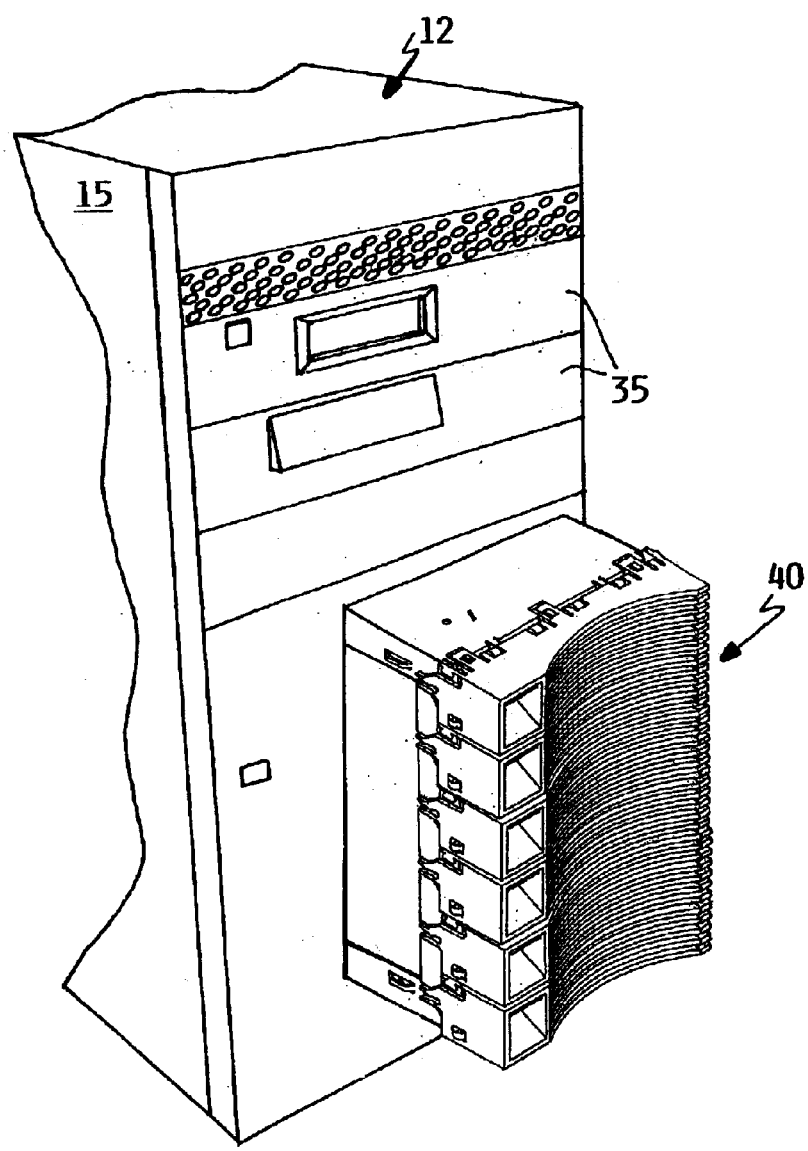
FIG. 8 is a perspective view of an acoustical insert assembly being mounted.

The first outlet 16 is formed in a rear portion 20 of the server housing chassis 15. The first outlet 16 is an exhaust port of an exhaust fan assembly 24 that draws a significant amount of the cooling air through the server. The second outlet 18 is positioned above the outlet 16 as depicted and includes a plurality of power unit fans 26, each associated with a power unit assembly. Typically, the pressure of the flow associated with the exhaust fan is higher than that associated with the combined power unit fans. The server 12 has a pair of inlet openings 28 and 30 formed in the front portion 32 (FIG. 2). The inlet opening 28 receives therein removable media 35 (FIG. 8). As will be described, the opening 30 is for hard disk drives, such as DASD's and is adapted to removably receive therein several types of acoustical insert assemblies 40, 40' (FIGS. 8–10); in a manner to be described.

Figure 3:
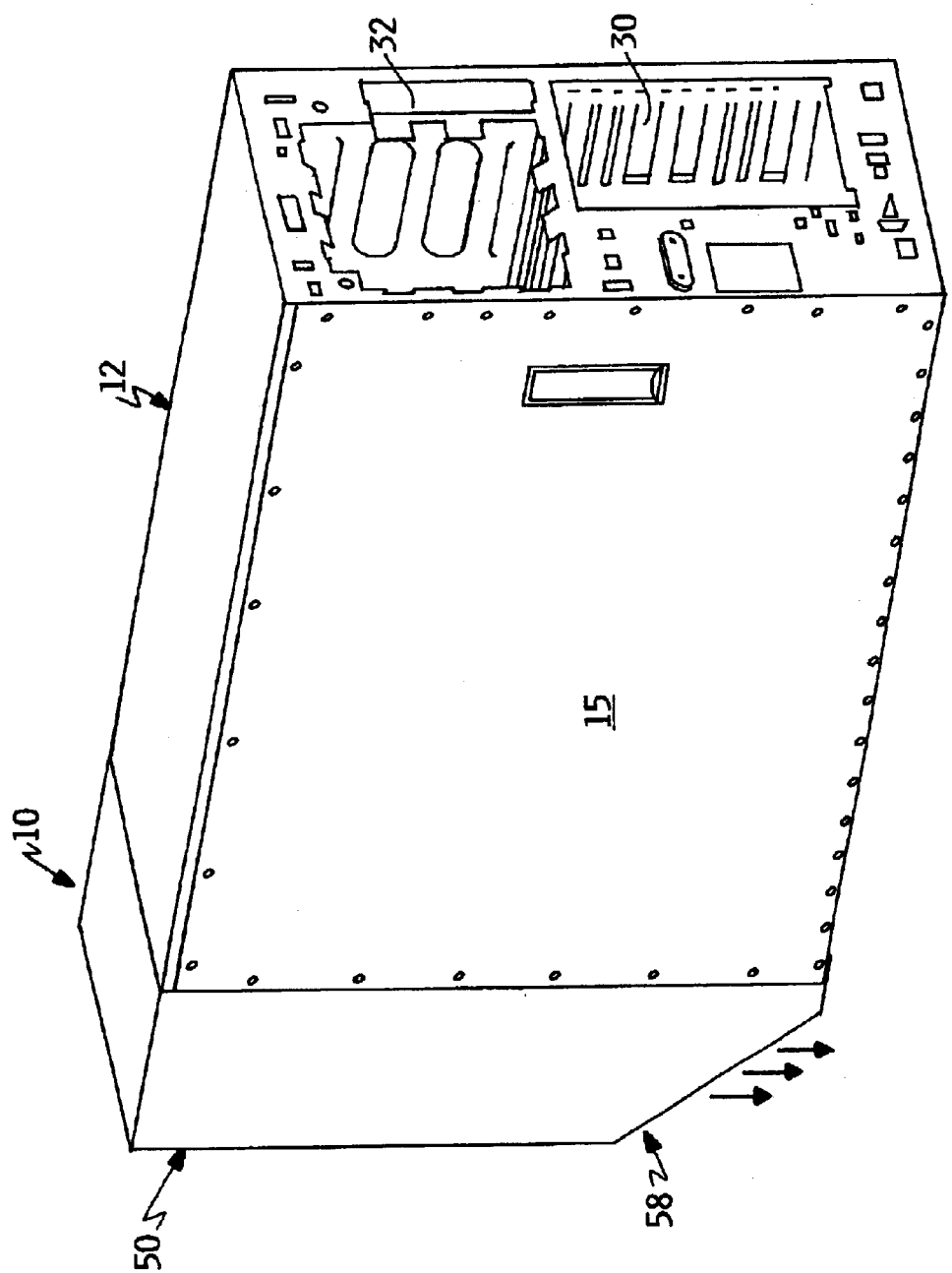
FIG. 3 is a view similar to FIG. 2, but illustrating the cover mounted on the server.

Reference is made to FIGS. 1–7 illustrating several features of a preferred embodiment of the fluid handling apparatus 10 of this invention. As illustrated, the fluid handling apparatus 10 includes a housing assembly 50 that is adapted to be removably attached to the rear of the server chassis 15; as depicted in FIG. 3. In an exemplary embodiment, the housing assembly 50 is of an unitary shell, preferably having the size and shape depicted so as to appear to be an extension of the server chassis 15. While this embodiment depicts that the housing assembly is attachable, it will be appreciated that the fluid handling apparatus can be an integral aspect of the chassis. Other configurations for the housing assembly are envisioned.

In the illustrated embodiment, the housing assembly 50 includes a planar back wall 52, top wall 54, and a pair of side walls 56. The back and side walls combine to define an air outlet or exhaust 58 as illustrated. The outlet 58 directs the pressurized air downwardly to, for example, the floor for additional acoustical suppression. Extensions 60 of the back wall form mounting pedestals 62. The mounting pedestals 62 have metallic inserts (not shown) made of galvanized steel or the like and having depressions which will not only mount on corresponding projections 63 (FIG. 6) on the chassis, but form an electromagnetic interference (EMI) connection between the housing assembly and the chassis. A pair of guide lugs 64 at the upper and interiorly facing portions of the side walls allow guiding of the housing assembly to the mounted position. A pair of spaced apart and generally robust spring-like clips 66 protrude downwardly into the housing are made of stainless steel or the like for providing an EMI connection. Due to this grounding, the housing assembly will not reradiate electromagnetic emissions. Accordingly, the foregoing EMI connections ground the housing assembly to the chassis, thereby controlling electrostatic discharge (ESD) and electromagnetic radiation (EMR) and correspondingly enhancing EMC.

Figure 4:
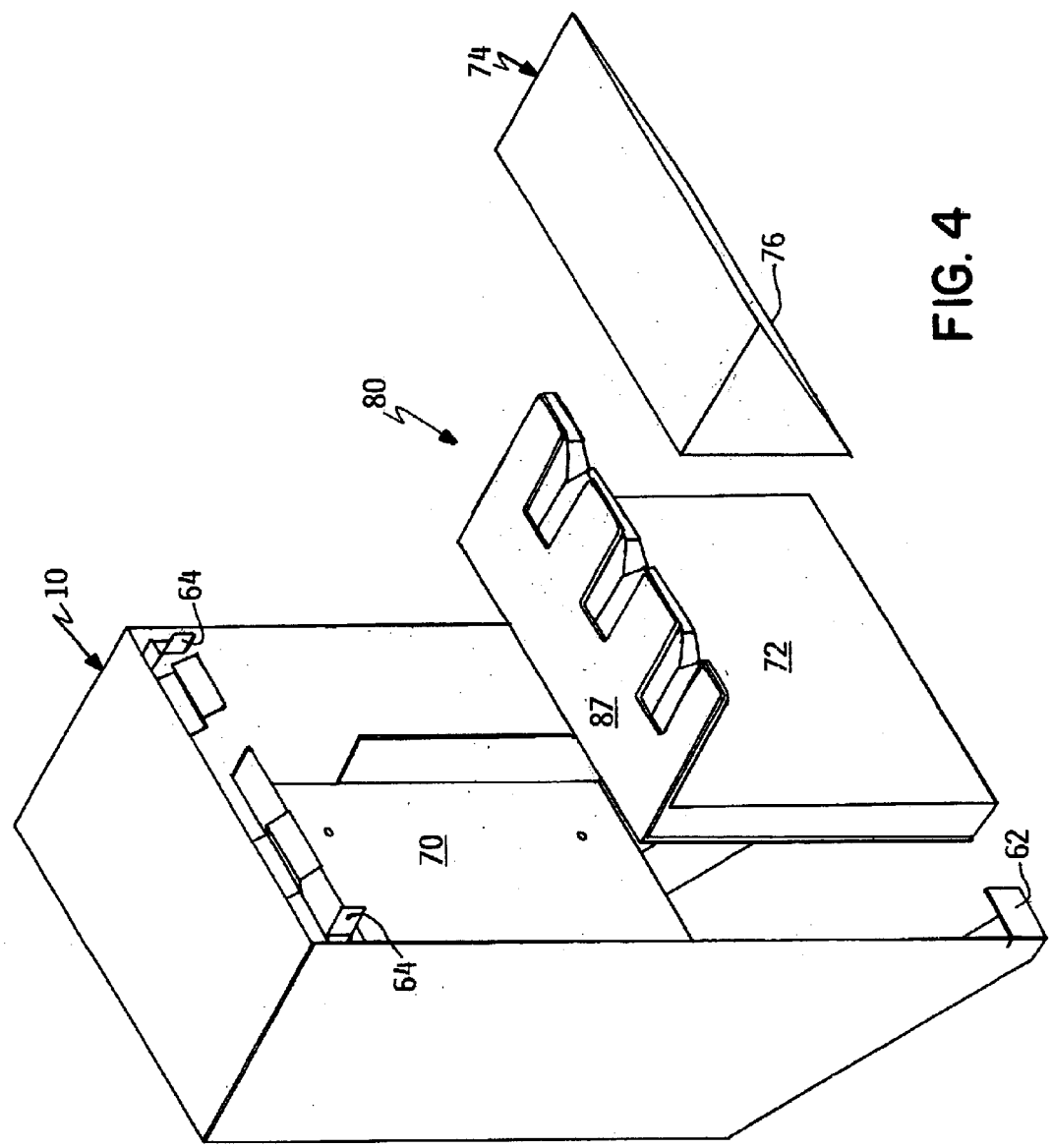
FIG. 4 is an exploded perspective view illustrating one preferred embodiment of a closure assembly of the present invention.
Figure 5:
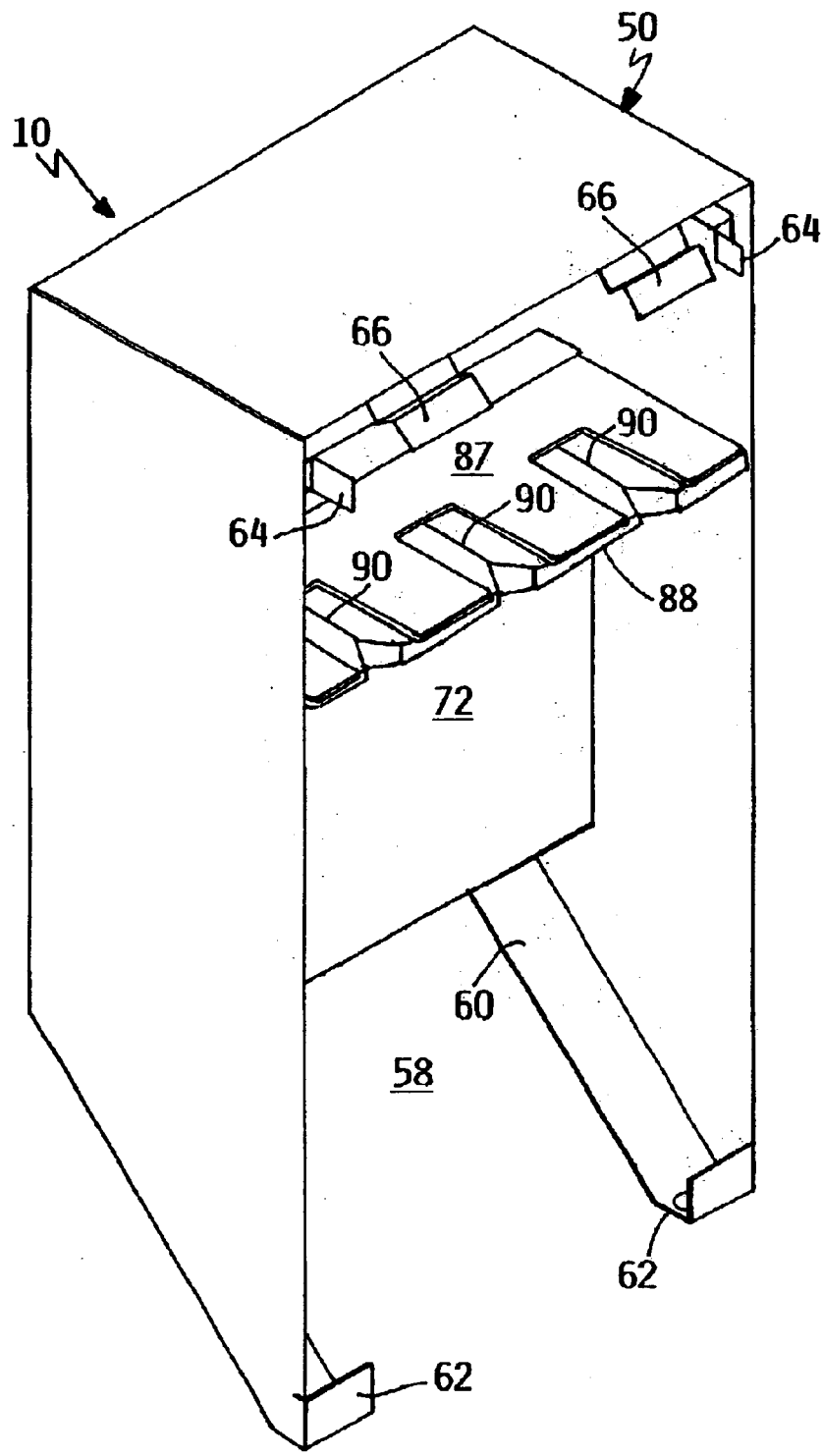
FIG. 5 is a view similar to FIG. 4, but illustrating the exploded components mounted.

FIG. 4 illustrates an internally disposed generally planar metallic partition 70 to which is attached a generally correspondingly shaped acoustical member 72. The acoustical member 72 has a plastic backing and can be attached to a surface of the partition as by pushpins with flanges so as to facilitate their ready removal; thereby enhancing seviceabiltiy and environmental advantages. It will be appreciated that the acoustical material can be made of any suitable material, such as acoustical foam or the like having the noise suppression characteristics desired. For instance, the noise suppression characteristics can be selected so at to contribute to achieving quiet office requirements of 5.5 bels LwAd that are generally found at so-called workstations. Another acoustical member 74 having a prismatic shape and made of a suitably selected attenuating material is removably inserted into the housing. The acoustical member 74 is adapted to be positioned in the upper interior corner of the housing member so as to be positioned opposite the power unit fans. The acoustical member 74 has a surface 76 at about 45° to the horizontal so as to bend the flow exiting the power unit fans. The acoustical member 74 bends the flow behind the partition 70 and towards the outlet.

FIGS. 4–7 illustrate a cable management system 80 according to the present invention. In this embodiment, the cable mounting system 80 is mounted interiorly of the housing assembly and is attached to the partition 70, as illustrated, for positioning and supporting one or more external computer system cables 82 that extend from the server. In addition, the cable management system 80 serves to sealingly separate passages 84 and 86 (FIG. 6) that are formed for inhibiting the commingling of the separate air flows.

Figure 6:
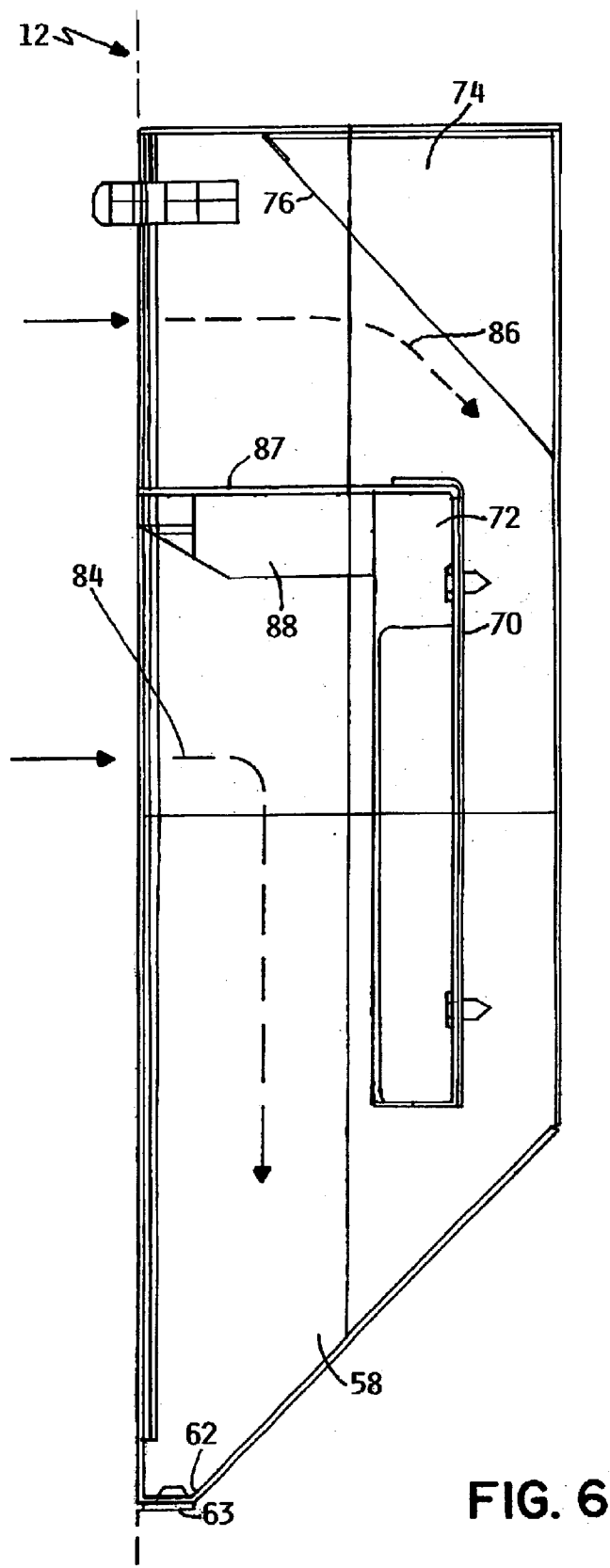
FIG. 6 is a schematic cross-sectional view of the closure assembly depicted in FIG. 5.
Figure 7:
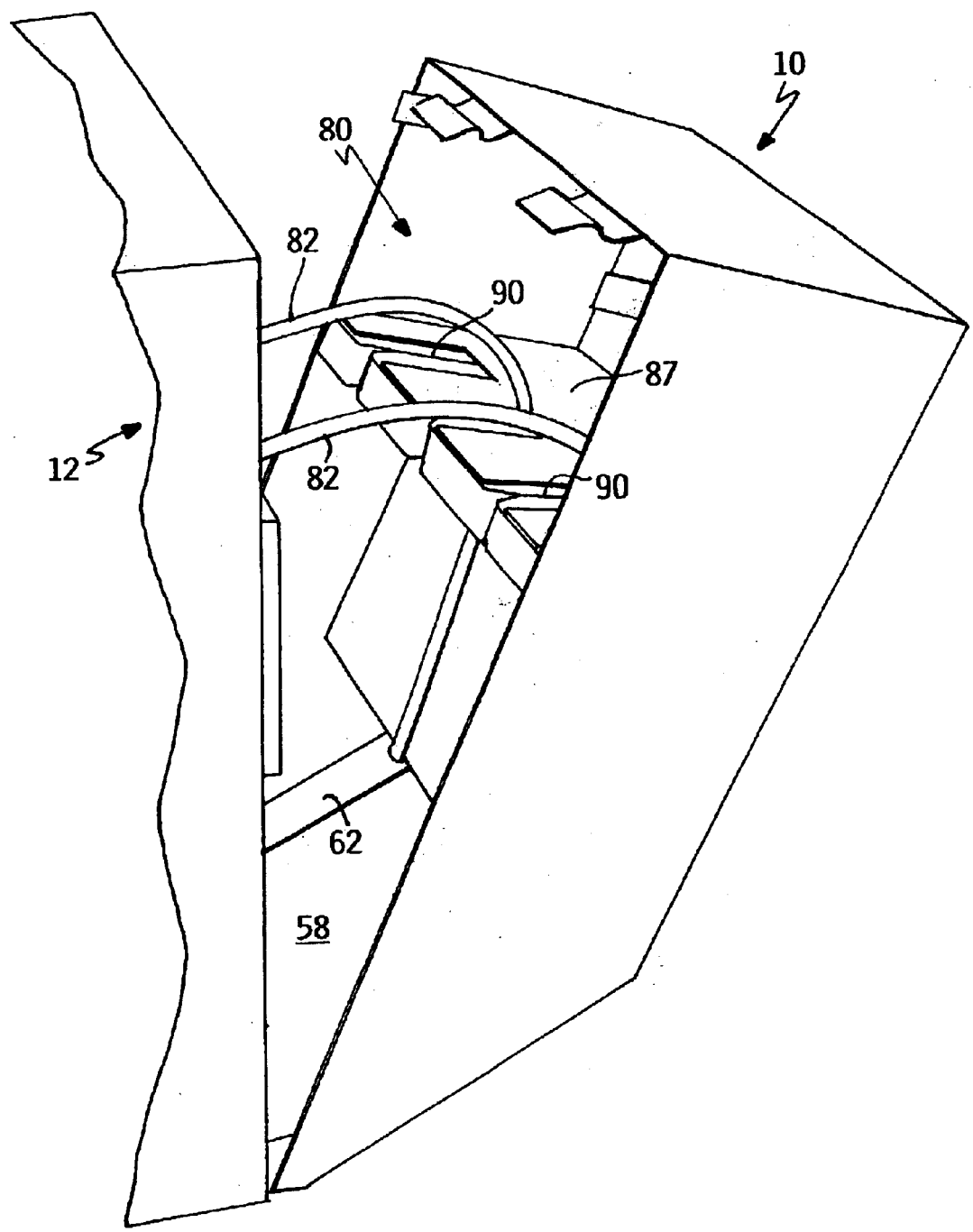
FIG. 7 is perspective view of the closure assembly illustrating the mounting of external cables to a cable management system of the present invention.

Each of the first and second passages cooperate independently with the first and second outlets for maintaining separation of the first and second pressure flows. In the exemplary embodiment, the cable management system includes an elongated segment or member 87 that is made of plastic or any other suitable material and serves to mount an additional noise attenuating member 88. The noise attenuating member 88 has the configuration shown and is adapted to sealingly separate the passages 84 and 86 (FIG. 6). A plurality of spaced apart and laterally extending slits 90, as viewed in (FIGS. 4, 5 and 7), are formed in the attenuating member having enlarged v-shaped mouths. Each of the slits 90 has a tapered inlet for facilitating accommodation of the cables. The noise attenuating member 88 is made of a material, such as acoustical foam or the like which is adapted to snugly and generally sealingly receiving portions of the external cables 82; as depicted in FIG. 7. Other sealing and/or noise attenuating arrangements can be used including a combination of joined or separated sealing and noise attenuating assemblies.

Figure 9:
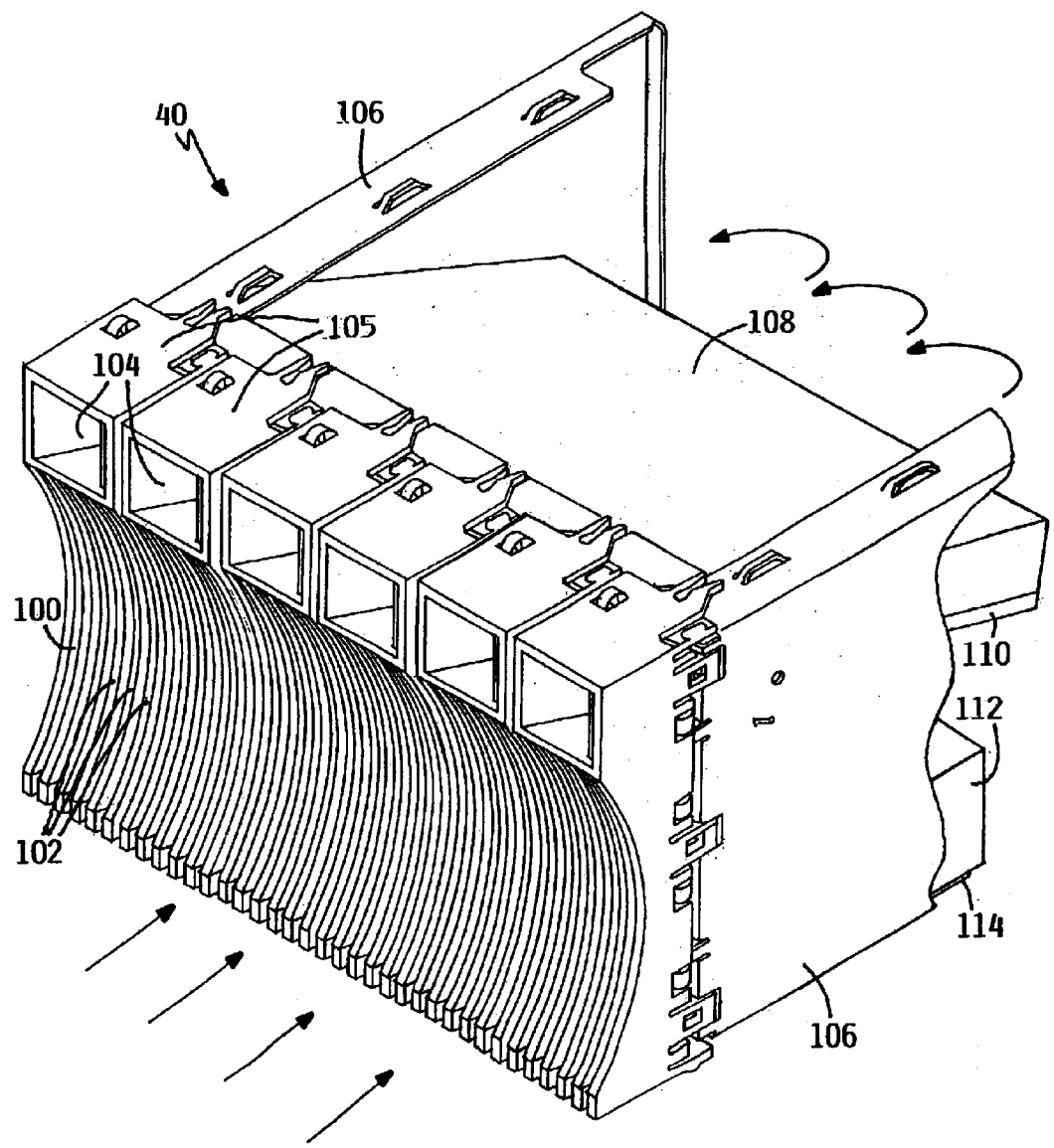
FIG. 9 is partial perspective view of the acoustical insert assembly illustrated in FIG. 8.
Figure 10:
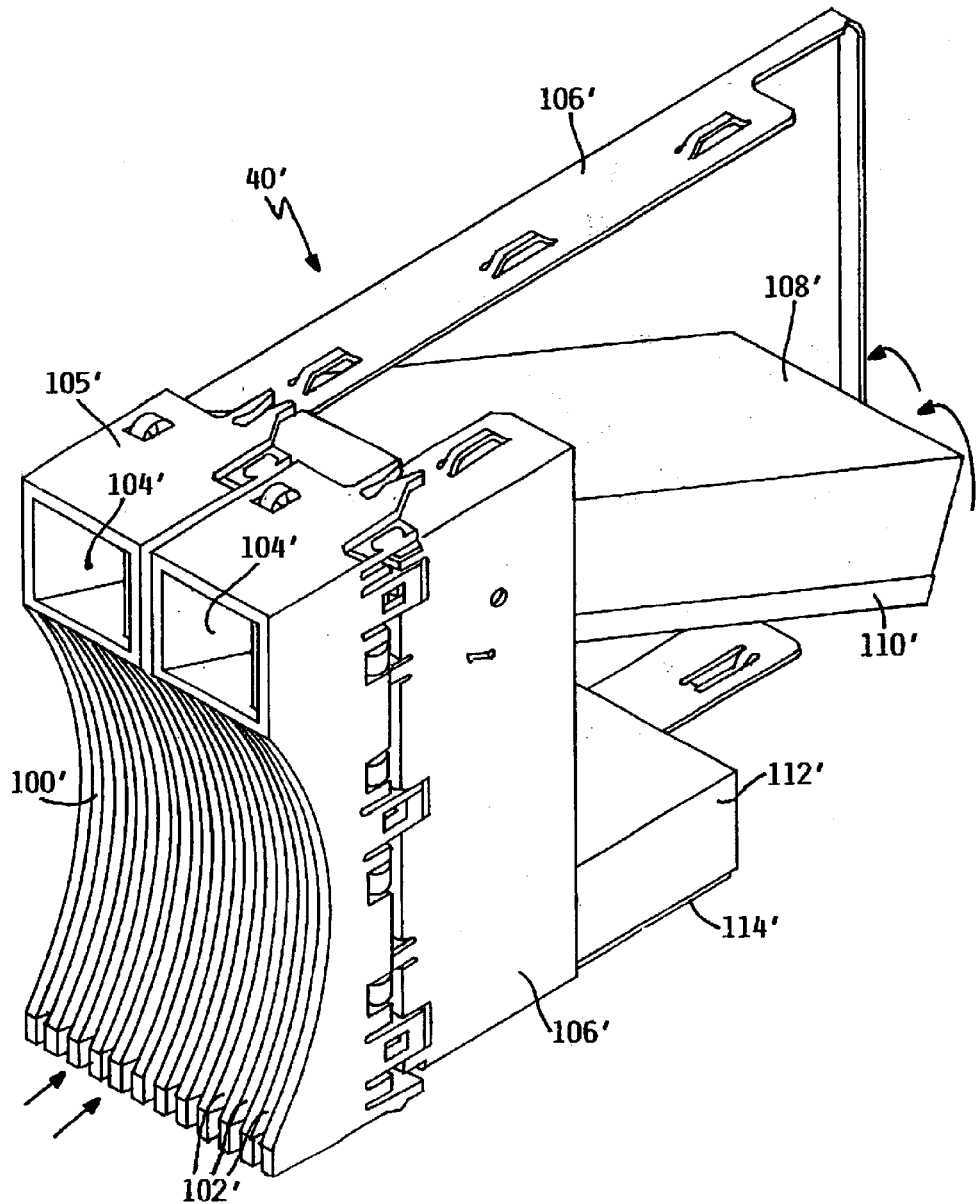
FIG. 10 is partial perspective view of an alternative embodiment of acoustical insert assembly.

Reference is made to FIGS. 8 & 9 for illustrating an alternate preferred acoustical insert assembly 40 for suppressing noise at an empty hard drive bay or DASD opening of the server. The acoustical insert assembly 40 includes a contoured cover portion 100 with vertically oriented slotted openings 102 that permit the passage of air therethrough. In addition to the openings 102, there is provided a series of generally horizontally disposed inlets 104 of inlet members 105 which permit the introduction of cooling ambient air into the interior of the server. It will be appreciated that the fans and blowers within the chassis are responsible for drawing the air through the openings and inlets. The cover portion 100 is attached to side walls 106 as by suitable clips or the like. In this embodiment for suppressing the noise, provision is made for a noise attenuating member 108 having the shape and size illustrated that is mounted on an inclined baffle 110 attached to the side walls 106. The noise attenuating member 108 can be made of similar material as the others described above for providing suitable noise suppression. The inclined baffle 110 redirects the incoming air even further reduce the noise attenuation provided by just the member 108 alone. Furthermore, an additional noise attenuating member 112 is secured to an upper surface of the bottom wall 114 for additionally suppressing noise. Reference is now made to FIG. 10 for illustrating an embodiment wherein a portion of a hard disk bay that is empty can be provided with noise attenuation through insertion of the acoustical insert assembly 40. The structure of this embodiment is similar to that of FIG. 8 will be represented by the same reference numeral with however the addition of a prime marking.

While the present invention describes use in combination with computer systems, it will be understood that the principles thereof are not limited to the computer systems, per se, but encompass other equivalent structures and functions as described herein.

Many advantages are derived from the present invention including the ability to easily and inexpensively handle air for achieving heat and noise suppression and for enhancing external cable management in a compact and easily constructed apparatus. The present invention additionally provides for the foregoing in a cost effective and easy installation system. Further advantages are achieved through application of easily mounted and serviced acoustical attenuator associated with air inlets and outlets. EMC and environmental concerns are also improved. Further advantages include the ability to easily convert a server to a workstation by satisfying acoustical issues.

The embodiments and examples set forth herein were presented to best explain the present invention and its practical applications and to thereby enable those skilled in the art to make and use the invention. However, those skilled in the art will recognize that the foregoing description and examples have been presented for the purposes of illustration and example only. The description set forth is not intended to be exhaustive or to limit the invention to the precise forms disclosed. In describing the above preferred embodiments illustrated in the drawings, specific terminology has been used for the sake of clarity. However, the invention is not intended to be limited to the specific terms selected. It is to be understood that each specific term includes all technical equivalents that operate in a similar manner to accomplish a similar purpose and those equivalents that are unforeseeable. Many modifications and variations are possible in light of the above teachings without departing from the spirit and scope of the appended claims.

What is claimed is:

1. A method adapted for handling fluid flow through a computer system having a fluid handling system internally of a computer chassis of the system, wherein the fluid handling system provides at least first and second outlets having corresponding higher and lower pressure flows with respect to each other; the method comprising: separating the higher and lower pressure flows from the first and second outlets externally of the chassis by providing at least a closure assembly having separate passages for each of the first and second outlets; further comprising supporting and positioning one or more external cables from the chassis by providing a cable management system within at least one of the passages.

2. The method of claim 1 further comprising using the cable management as a separating wall for sealingly separating the separate passages from each other and for allowing one or more external cables to pass therebetween.

3. The method of claim 1 further comprising suppressing noise by bending the separate passages and providing at least a removably acoustical member to a preselected location within at least one of the separate passages.

4. The method of claim 1 wherein the closure assembly is grounded to the chassis by application of connecting members which enhance EMC.

5. The method of claim 1 further comprising releasably mounting the closure assembly to the chassis.

6. The method of claim 1 further comprising suppressing noise by placement of an acoustical insert assembly including one or more noise attenuating members within an inlet end of the fluid handling system of the computer system.

7. An apparatus adapted for handling fluid within a computer system having a fluid handling system internally of a computer chassis of the system, wherein the fluid handling system provides at least first and second outlets having corresponding higher and lower pressure flows with respect to each other; the apparatus comprises: a housing assembly attachable to the chassis; the housing member includes partitions that form at least a pair of first and second fluid passages constructed and sized so that when the apparatus is mounted to the chassis, each of the first and second passages cooperate independently with the first and second outlets for maintaining separation of the first and second pressure flows; and, a cable management system mounted within the housing assembly for positioning and supporting one or more external computer system cables.

8. The apparatus of claim 7 wherein the cable management system includes a segment that forms at least a part of the partitions separating the first and second passages.

9. The apparatus of claim 8 wherein and allow one or more external cables to pass therethrough between the separate passages.

10. The apparatus of claim 8 wherein the cable management segment also provides for noise suppression.

11. The apparatus of claim 7 further comprising having the separate passages provide for bends for acoustical attenuation and include at least a removably acoustical member at a preselected location within at least one of the separate passages.

12. The apparatus of claim 8 wherein the housing assembly is removably secured to the chassis.

13. The apparatus of claim 12 wherein the housing assembly is grounded.

14. A computer system comprising:
   a computer chassis including one or more external cables extending from the chassis;
   a fluid handling system internally of the chassis and comprising at least first and second fluid outlets having corresponding higher and lower pressure flows with respect to each other;
   an apparatus adapted for handling fluid within a computer system; the apparatus comprises: a housing assembly attachable to the chassis; the housing member includes partitions that form at least a pair of first and second fluid passages constructed and sized so that when the apparatus is mounted to the chassis, each of the first and second passages cooperate independently with corresponding ones of the first and second outlets for maintaining separation of the first and second pressure flows; and further including a cable management system mounted within the housing member for positioning and supporting one or more external computer system cables.

15. The computer system of claim 14 comprising: an acoustical insert assembly is preferably mounted within an inlet opening of the fluid handling system for attenuating noise at the inlet.

16. The computer system of claim 15 comprising: the housing member includes partitions that form at least a pair of first and second fluid passages constructed and sized so that when the apparatus is mounted to the chassis, each of the first and second passages cooperate independently with the first and second outlets for maintaining separation of the first and second pressure flows.

17. The computer system of claim 16 wherein the cable management system includes segments that form at least a part of the partitions separating the first and second passages and allow one or more external cables to pass therethrough between the separate passages.

* * * * *